3 Sheets—Sheet. 1.

W. A. Foskett, & H. B. Tyler.
Brush Machine.

No 92,181.     Patented July 6. 1869.

Witnesses
Edwin Case
E. A. Thompson

Inventors.
William A. Foskett
Henry B. Tyler
by attys
Sanford & Prescott

W. A. Foskett, & H. B. Tyler.
Brush Machines.
No. 92,181.   Patented July 6, 1869.
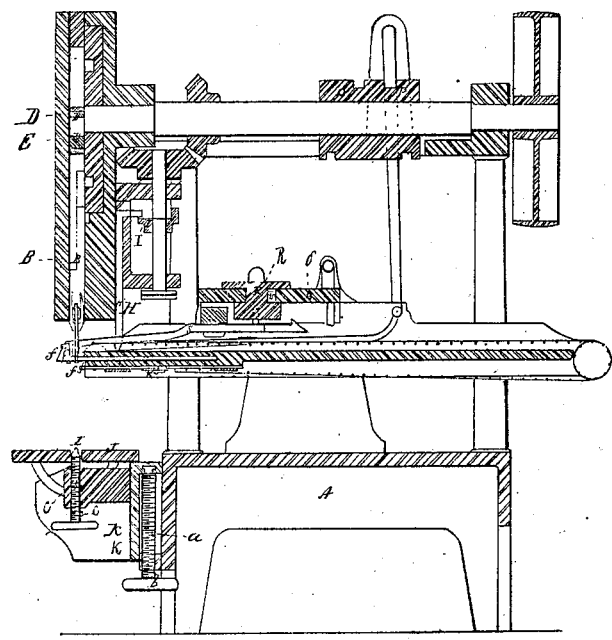
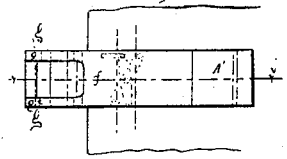
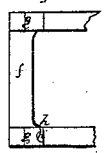
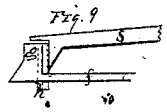
Witnesses
Edwin Case
E. A. Thompson
Inventor
William A. Foskett
Henry B. Tyler
by attys
Sanford & Prescott 3 Sheets - Sheet 3.

W. A. Foskett & H. B. Tyler.
Brush Machines.

Nº 92,181.    Patented July 6, 1869.

Witnesses
Edwin Case
E. A. Thompson

Inventor
William A. Foskett
Henry B. Tyler
by attys
Banford and Busey

United States Patent Office.

WILLIAM A. FOSKETT AND HENRY B. TYLER, OF NEW HAVEN, CONNECTICUT.

Letters Patent No. 92,181, dated July 6, 1869.

---

IMPROVED MACHINE FOR MANUFACTURING BRUSHES.

---

The Schedule referred to in these Letters Patent and making part of the same.

---

*To all whom it may concern:*

Be it known that we, WILLIAM A. FOSKETT and HENRY B. TYLER, of New Haven, in the county of New Haven, and State of Connecticut, have invented a new and useful Machine for Manufacturing Brushes; and we do hereby declare that the following is a full and exact description of the same, reference being had to the accompanying drawings, and to the letters of reference marked thereon.

Figure 2 is a longitudinal vertical section of the same, taken through line $x\,x$;

Figure 6 is the plan view of the two slides $f$ and A', showing their operation, and their relative positions with relation to each other;

Figure 7 is a section of the same, taken through line $y\,y$; and in

Figures 8 and 9 are two views of the end of the slide, showing the operation of the cam $h$, placed in one of the projections $g$.

Similar letters of reference, where they occur in the separate views, indicate like parts.

Figure 1:
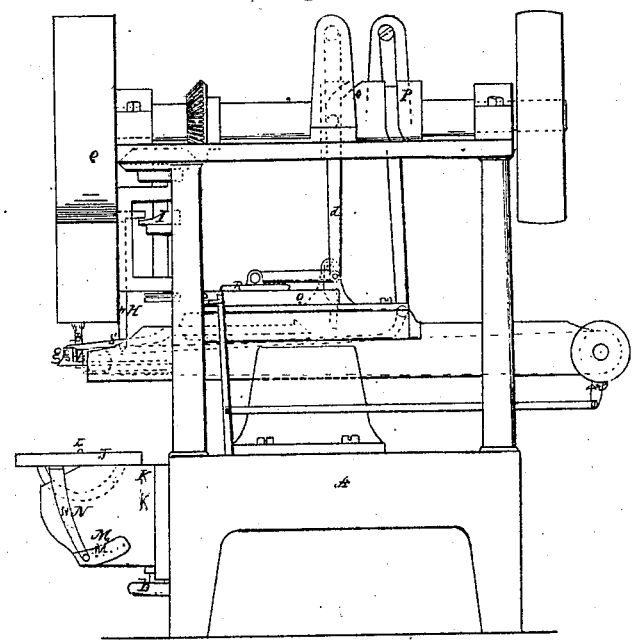
Figure 1 is a side view of our improved brush-machine.

Our invention relates to certain improvements in the construction of machines for manufacturing brushes, for which improvements a caveat was filed by us on the 26th day of December 1868.

Our invention consists in placing the operative parts of the machine in such a position, with relation to each other, as to greatly simplify the whole machine, rendering it more compact, much less complicated, and, consequently, less liable to get out of order.

In obtaining this result, we have originated several new modes and combinations, to be hereafter described. These render the machine practical, which has never before been done, as, in the machine now in use, for which a patent was granted to A. M. White, December 22, 1868, (upon which our invention is an improvement,) it has been found that the great complicity of parts renders it too expensive, and too liable to get out of order, to be of practical advantage, whereas, in our machine, all the parts are of the simplest possible construction, and we are enabled, by the use of our improvements, to perform the work better and faster than in the other machine. We are also able to produce many different variations, both in size and form, of the brushes, which could not be done upon the original machine.

The novel portions of our invention are, the two corresponding sets of inclines, in connection with the punch, for varying the throw of the same; separating the former from its operating-lever, to allow of its being easily removed; the peculiar method of operating the divider, in order that it may be more effectual in its work, and be independent of the fingers; the slide for elevating or depressing the table upon which the block is held, to allow the use of a block of any thickness for a brush-back; the centre-pin, to be used as a guide for the block, while the bristles are being placed therein; the arm attached to the table, in connection with the index, for the purpose of holding the brush-block at any given angle with the punch; placing the cams which operate the fingers and slide upon the main shaft, for the purpose of simplifying their operation, and making the machine more compact; feeding the bristles from the rear end of the machine, to facilitate the operation, and make the machine more compact; the cam or incline, in connection with a pin, for locking and holding the fingers apart for a certain portion of the receding movement; also, the mode of thus locking the fingers by any other mechanism, for the purpose of allowing the other portions of the machine to perform their functions without interference; the cam-shaped pin in the end of the slide, which operates in connection with the fingers, to allow for the inequality between the two ends of the bunch of bristles; and a slide, to operate immediately the fingers have receded, to hold the bristles in position, and prevent any being drawn back by the fingers and slide.

To enable others skilled in the art to make and use our invention, we will proceed to describe the construction and operation of the same, with reference to the accompanying drawings.

A is the frame, by and upon which the several operative parts of our improvements are supported.

Figure 4:
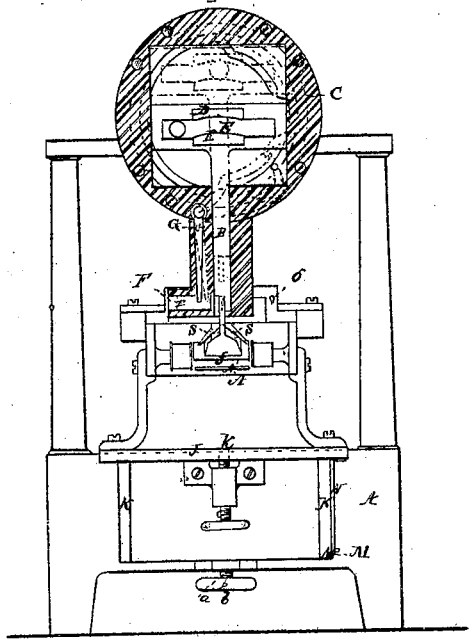
Figure 4 is a front-end view, showing the head, with the face-plate removed, to more clearly show the operation of the punch and the former.

The punch B is held and operated in the head C, both of which are similar to the punch and head used in the original machine, except that we place upon the said punch B, inside the said head C, above and below the crank-pin or cam-roller by which the said punch is operated, two steel blocks or cams, D and E, both of which are provided with corresponding inclines, as shown in fig. 4.

The object of these inclines is to provide a means of varying the length of stroke of the punch. This is done by changing the said blocks, placing upon the punch a set in which the angles of the inclines are more or less acute, as the case may require, in order to lengthen or shorten the stroke.

In the lower portion of the head C, the former F is placed, over which the wire is bent by the descending of the jaws of the punch.

The said former slides back and forth in bearings formed in the head, and is operated by means of a lever, G, which, in turn, is operated by a cam upon the main shaft, revolving within the said head C.

In the original machine, the former and lever were made of one and the same piece. This subjected it to the inconvenience, that whatever strain there might be upon the former, caused by the bending of the wire, would actually come at the point where the said former and lever joined, or be transmitted to some point upon the lever itself, and thus cause a constant wear upon the lever, thus requiring its frequent removal; and another objection is, that where the lever and former are made in the same piece, one cannot be removed without removing the other. Thus great care has to be used, in tempering and repairing the former, to keep it in its proper relative position with its lever. In our improvement, however, all these difficulties are done away with, by making the former and lever entirely separate from each other, as shown in fig. 4. The former is held in bearings in the head, which take all the strain, and by which it is held more firmly than could possibly be done in any other way.

This mode of construction also provides a means of retempering or replacing, by a new one, the said former, without disturbing or altering the position of the lever G.

Just back of the head C, upon which it is held in proper bearings, a slide, H, is placed, which is attached to and operates the divider by means of the cam I, placed upon the shaft of the feeding-device.

In the original machine, this divider was made to operate with and was really a component part of the fingers, making its operation entirely dependent upon the said fingers, causing great inconvenience in adjustment, and being continually liable to get out of order. In our machine, by placing the divider upon the slide H, as before described, we separate it entirely from all connection with the fingers, and obtain the desired result with greater certainty, and with less trouble and inconvenience.

Held in semicircular bearings below the head C, we place a table J, the object of which is to hold the brush-back or block either horizontal to, or at an angle with the punch B.

The semicircular bearings of this table rest in the slide K, held upon the frame A.

This slide is for the purpose of elevating or depressing the table J, in order that a brush-back may be used of any thickness, without causing trouble in the operation of the punch.

This slide K is operated by means of a screw, $a$, and hand-wheel $b$, as shown in fig. 2.

In the centre of the table J, and projecting a short distance through it, perpendicularly, in line with the punch, we place a centre-pin, L, the object of which is to act as a guide to the block, in order that, by the use of a pattern, upon which the brush-back is held, (the lower surface of which pattern is furnished with a number of holes exactly corresponding to those in the said brush-back,) the said pin L may enter one of the holes in the pattern, and thus present the corresponding hole in the brush-back in proper position under the punch for the insertion of bristles.

The pin L is held in the slide K, and may be raised or lowered, if necessary, by means of the screw $c$, to which it is attached, as shown in fig. 2.

In making certain kinds of brushes, particularly those of oval form, it is necessary to bore the holes, and place the bristles in the brush-back or block, at different angles with each other, each row having its own particular angle with reference to the said block. To obtain these angles—that is, to hold the block in the proper position, or at the proper angle, in order that the holes placed therein may be perpendicular under the punch—the table J is used, as before described.

In order, however, to ascertain exactly the required angle, we make use of the index-plate M; and, to hold the table rigidly at the angle required, we furnish it with an arm, N, one end of which is held firmly upon the said table, and the other travels upon the said index M.

This arm N is provided with some suitable mechanical device for fastening and holding it, when in the required position, upon the index M.

A table provided with a universal or ball-and-socket joint has long been in use, and may be equivalent to the table made use of by us; but it has never before been arranged so as to be rigidly held at the required angle while the operation is being performed.

The cams O P, which operate the fingers upon the bristles, and carry the said fingers and bristles forward and under the punch, are both placed upon the main shaft, back of the head C. This makes our machine much more compact, and, by the arrangements of the several parts which are operated by the said cams, we are enabled to use them in this position to a better advantage than when placed, as in the original machine, upon an auxiliary shaft, besides making them more firm and sure in their action.

The bristle-feed in our machine is of similar construction to that in the machine which is now used, but its position upon the machine, and its connection with the other improved parts, render its use entirely different.

In our improvement, the feed-belt is carried through the machine, and the bristles are taken from the rear, and from the same side of the head C as the wire.

Placing the feed in this position, renders it more out of the way, as it leaves the front of the machine, for the reception and working of the block, upon the table J.

Q is a slide, placed upon the frame of the bristle-feed, and is operated indirectly by means of the lever $d$ and the cam O, but directly by the slide R, as will hereafter be described.

Upon the under side of this slide, the fingers S S are held, in such a way as to allow for their different movements.

Upon the upper side of the slide Q, and by means of which it is operated, we place a smaller slide, R, which is connected directly with the lever $d$, and furnished with two angular slots, cut in its lower surface.

Into each of these slots, a pin or roller upon one of the fingers S S is fitted.

Figure 5:
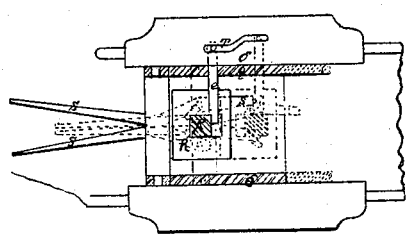
Figure 5 is a partial section of a portion of the slide Q, showing the operation of the fingers, and the mode of locking the same.
Figure 3:
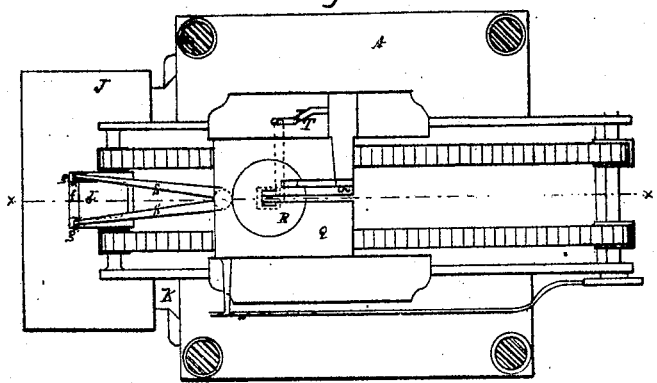
Figure 3 is a plan view, with the head and upper portion of the machine removed.

As the slide R advances, these slots act as a cam or incline upon the pins, and force them apart, as shown in figs. 3 and 5, and thus separate the bristles.

When the said fingers have been thus forced apart to their proper position, the slide R comes in contact with the slide Q, which, with the fingers thereto attached, is carried forward the required distance, to allow the fingers to perform their function.

In the frame of the slide Q, we place an inclined slot or cam, T.

Into this slot, a roller is fitted, which is held upon the slide or pin $e$, which extends horizontally from the said slot back of the slide R, upon which it operates.

When the slides Q and R are being carried forward, the roller upon the pin $e$, which travels in the slot T, forces the said pin back of the slide R, and in contact with it, and thus prevents the slide from receding, until it is released by the drawing back of the pin $e$.

By thus preventing the slide R from receding upon the slide Q, as it would were it not for the pin or slide $e$, we are able to keep the fingers S S locked or held apart for the first part of their backward movement, in order that they may not come in contact with the other parts of the machine.

$f$ is still another slide, which is operated by the cam P.

Between projections g g, upon this slide, and the fingers S S, the bristles are grasped, and carried forward and under the punch.

In almost all cases, especially where assorted bristles are used, there will be a difference in thickness between the two ends of the bunch. This causes one of the fingers to pinch and hold the bristles, while the other does not.

To avoid this difficulty, and cause both ends of the bunch to be pinched equally hard, we place a cam, h, in the slide f, and extending partially into the projection g, as shown in fig. 8.

When there is no difference in the thickness between the two ends of the bunch, and the cam is not wanted, it can be turned back, as shown in black, fig. 8, so that it will not extend beyond the projection; but, in case it is wanted, it can be turned outward, as shown in red, figs. 8 and 9, and enlarge or widen the said projection.

Attached to and sliding upon the under side of the frame of the bristle-feed, just below the slide f, we place a plate or slide, A', which is operated, through the lever k, by the said slide f.

The object of this slide is to act upon the bristles immediately after the fingers have released them, and prevent any of the said bristles from being carried back with the fingers.

This completes the construction of our improvements. The operation is as follows:

After the machine has been set in motion, the bristles are brought forward by the operation of the bristle-feed. A certain number, sufficient for one insertion, is passed forward. The divider H is now released from the cam I, and immediately falls, and separates the bunch or tuft from the mass of bristles upon the feed. The fingers S S are now forced apart, and brought forward by the action of the slides Q and R and lever d, as before described, and the two ends of the bunch or tuft of bristles are grasped between the said fingers and the projections g g, upon the slide f. If one end of the bunch exceeds the other in thickness, the cam h is turned sufficiently to make up for this difference, and cause both fingers to press equally hard upon the bristles. When the bristles have been thus grasped, the fingers and slide f continue to advance, caused by the action of the cams O and P, until the bunch or tuft is passed under the punch B, where it is held, until it is taken by the jaws and punch, and inserted in the block.

When the fingers S S and slide Q advance, the slide R is forced forward to the position shown in fig. 2. The slide or pin e, attached to the slide Q, advances with it.

The roller upon the said slide or pin e travels in the slot T. As the said slides advance, this roller is brought in contact with the incline of the said slot T. This forces the pin e back of the slide R, as shown in black, fig. 5. The roller now travels in the forward part of the slot, which runs parallel with the slide Q.

When the fingers have performed their work, and the slide begins to recede, the tendency would be to first draw the slide R back, and close the fingers. This is prevented, by the position of the slide or pin e, until the roller upon the said pin strikes and travels up the incline. This draws the pin e away from the slide R, as shown in red, fig. 5, which, when released, is immediately drawn back by the lever, and allowed to operate upon the fingers, and throw them together, as shown in red, fig. 5. In this position, they are carried back, in readiness to again operate upon the bristles.

As the slide f recedes, it operates the lever k, and causes the plate or slide A' to advance, as shown in red, figs. 6 and 7, which acts upon the bunch of bristles last set, and separates it from all connection with the slide f and the fingers, and prevents any bristles from catching upon the same.

When the slide f advances, the plate A' is immediately drawn back and away from the punch, to allow the said punch to perform its work, and is thus held in readiness to operate again immediately after the punch has finished.

The punch B is operated by a cam or crank upon the main shaft, and placed within the head C. The length of the stroke of this punch may be altered at any time, by removing the blocks D and E, and inserting others in their places, provided with inclines, which have the suitable angle to give the requisite variation in the length of the stroke of the punch.

The wire, after being carried into the machine by the wire-feed, and cut, is bent over the former by the descending of the jaws of the punch. After it has been thus bent, the said former F, by the action of the lever G, slides back and away from the wire, leaving the said wire between the jaws, by which it is carried downward over the bristles, and, by the action of the punch, inserted in the block or brush-back.

The position of this block may be altered with reference to the punch—that is, it may be placed nearer to or further from the said punch—by raising or lowering the slide K, by means of the screw a.

When this slide is set at the proper distance from the punch, which distance must be governed by the thickness of the brush-back, the said brush-back, after it has been fastened upon the guide or pattern, is placed upon the table J of the machine. One of the holes in the guide or patterns is placed over the centre-pin L, which may be raised or lowered, to suit convenience. This brings the corresponding hole in the brush-block in the proper position for an insertion of bristles. It is thus held until the bristles have been set, and the punch withdrawn, when it is moved along until the next hole is brought over the centre-pin L, which brings the next hole in the brush-block in position. When this is filled, it is moved on to the next, and so on, until the whole brush is finished, or until all the holes in the block have been filled.

By this means, we are enabled to fill a block of any length, and are not restricted, as in the original machine, to a given size or shape of the block.

We are aware of the patent of A. M. White, of December 22, 1868; and

What we claim as our invention, and desire to secure by Letters Patent, as improvements on the said machine, is—

1. The double-incline blocks D and E, in combination with the punch B, for the purpose of varying the stroke of the said punch, substantially as shown and described.

2. Constructing the former F separate from the driving-lever G, substantially as shown and described.

3. The arrangement and construction of the divider-slide H and cam I, to operate independently of the fingers, as shown and described.

4. The construction and arrangement of the slide K, in combination with the table J, for elevating and depressing the same, substantially as shown and described.

5. The combination of the index-plate M and arm N with the table J, to give any required angle, in the manner substantially as shown and described.

6. The arrangement of the bristle-feed table in connection with the other parts of the machine, in order that the bristles may be fed from the same end of the machine at which the wire is fed, which renders the machine more compact, as shown and described.

7. Locking the fingers S S apart, for the first portion of their backward movement, by the cam-shaped or incline slot T, in combination with the pin e and slide R, as shown and described.

8. The cam $h$, in combination with the projection $g$, upon the slide $f$, to allow for the varying thickness between the two ends of the bunch of bristles, substantially as shown and described.

9. The slide A', in combination with the slide $f$ and fingers S S, for the purpose of separating the bristles, fingers, &c., substantially as shown and described.

10. In combination with the table J and its devices, the centre-pin L, for holding the plate in position under the punch, substantially as shown and described.

This specification signed and witnessed, this 14th day of May, 1869.

WILLIAM A. FOSKETT.

Witnesses:
HENRY B. TYLER.
RUFUS H. SANFORD,
FRANK PRESCOTT.